3,808,190
PROCESS FOR THE PREPARATION OF ASPARTYL DIPEPTIDE ESTERS INVOLVING LITTLE RACEMIZATION

Johannes J. Dahlmans, Maastricht, Bernardus H. N. Dassen, Kerkrade, and Wilhelmus H. J. Boesten, Sittard, Netherlands, assignors to Stamicarbon N.V., Heerlen, Netherlands
No Drawing. Filed May 18, 1971, Ser. No. 144,639
Claims priority, application Netherlands, May 19, 1970, 7007176; Nov. 13, 1970, 7016630
Int. Cl. A23l 1/26; C07c 103/52
U.S. Cl. 260—112.5                                17 Claims

ABSTRACT OF THE DISCLOSURE

A process for preparing aspartic amino acid esters is disclosed wherein N-carbobenzoxy aspartic acid anhydride, an amino acid ester salt and a base are reacted together producing N-carbobenzoxy aspartic amino acid ester. The N-carbobenzoxy aspartic amino acid ester is then hydrogenated in the presence of a palladium catalyst to split the N-carbobenzoxy group from the aspartic amino acid ester. The aspartic amino acid esters have sweetening properties and can be used as a sweetening agent. Alpha and beta aspartic amino acids can be produced.

---

The present invention relates generally to α-aspartyl amino acid esters and the corresponding β-aspartyl compounds. Such compounds can be employed in scientific research work and as building elements in the synthesis of polypeptides. However, the present invention is particularly related to various α-aspartyl amino acid lower alkylesters found to have sweet taste and can, thus, be used as sweetening agents in the preparation of foodstuffs, candies, luxuries, medicine and sweeteners. More particularly, the invention is directed to the preparation of sweet-tasting aspartyl amino acid alkylesters. The α-L-aspartyl-L-amino acid alkylesters have a more pronounced sweetening effect than the corresponding compounds in which one or both amino acids occur in the DL form. The β-isomers do not have a sweetening effect, but they do not interfere with the action of the α-isomers.

In the synthesis of aspartyl compounds, the α-isomer is usually the desired product. Producing the α-isomer involves the problem of suppressing or preventing the formation of the β-isomer. According to a known, but costly and laborious method from peptide chemistry, the α-isomer can be produced starting from an aspartic acid derivative, in which the β-carboxyl group has been converted to a stable ester group, and the α-carboxyl group converted to a reactive ester group. An example of such a derivative is N-carbobenzoxy-asparatic-acid α-p-nitrophenyl-β-benzyl diester. Rather than the diester derivative, however, the use of a N-protected aspartic acid anhydride as the starting material is generally preferred because the anhydride derivative can be easily prepared by allowing the N-protected aspartic acid to react with acetic acid anhydride (see Journal Am. Chem. Soc., 81, 167 ff., 1959). If a solution of N-carbobenzoxy-aspartic acid anhydride in an organic solvent is added to a solution of an amino acid alkylester in an organic solvent, the α-N-carbobenzoxy-aspartyl-amino acid alkylester is obtained in a yield of at most 40% based on the anhydride (see Le Quesne and Young, Journ. Chem. Soc., 1952, p. 24). Moreover, irrespective of the starting aspartic acid derivative, racemization of the amino acids takes place and diketopiperazine compounds are formed in a side reaction. The racemates and the side products are difficult to isolate from the desired products. The esters of amino acids containing a phenyl group, e.g. phenylalanine esters, phenylglycine esters, or tyrosine esters very readily form diketopiperazine compounds. Because of the formation of by-products which are difficult to remove, the above synthesis of α-aspartyl compounds is not suitable for technical production, and due to the numerous drawbacks mentioned above, the process is not of commercial importance.

It has now been found possible to prepare aspartyl amino acid esters by reacting N-carbo-benzoxy-aspartic acid anhydride with an amino acid ester and then isolating the resulting N-carbobenzoxy-α-aspartyl-amino acid ester and/or the corresponding β-aspartyl compound. The carbobenzoxy group is then removed from the aspartyl-amino acid ester by catalytic hydrogenation. The reaction between the aspartyl amino acid ester and the N-carbobenzoxy-aspartic acid anhydride is carried out by adding the salt of an amino acid ester and N-carbobenzoxy aspartic acid anhydride in an inert, polar solvent with simultaneous addition of a base. The amount of base added is at least equivalent to the amount of the amino acid ester. It has been unexpectedly found that this process results in good yields, and the formation of diketopiperazine compounds is almost completely suppressed.

The base used in the process of this invention is an aqueous solution of an inorganic base, or an organic base soluble in the reaction medium. The base used can be monovalent or multivalent, provided it is soluble in the reaction medium and its basicity, established from the $pK_b$ values, is higher than that of the amino acid ester. The base should react as little as possible with the anhydride and with the ester group of the amino acid ester.

When using an organic base, it is preferred to use tertiary nitrogen bases, having the general formula

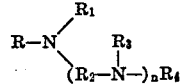

wherein $n$ is 0 or 1 and R, $R_1$, $R_3$, and $R_4$ are lower alkyl, and $R_2$ is lower alkylene, such as triethylamine, tri-n-propylamine, N,N - dimethylbutylamine or N,N' - tetramethyl ethylene diamine. The organic base may be added as such, or as a solution in a solvent. When using an inorganic base, a carbonate or bicarbonate dissolved in water can be used, and more particularly an alkali metal carbonate or bicarbonate is preferred. The base is preferably used in molar excess relative to the amount of the amino acid ester. The base is added at such a rate that the N-carbobenzoxy aspartic acid anhydride will be present in the largest possible excess relative to the amount of amino acid ester released. This rate depends on the nature and the concentration of the reactants, and on the reaction velocity.

When an aqueous inorganic base is used, a high coupling efficiency and a high selectivity towards the α-isomer are obtained. It is possible to obtain α-isomer yields of over 75 mole percent, based on the anhydride. For optimum results in the selectivity of the α-isomer, less than 0.5 part by volume of water per one part by volume of organic solvent should be present during the reaction. For this reason, it is preferred to add an aqueous potassium-carbonate solution, because of the high solubility of the potassium carbonate, only a very small amount of water need be used. Under these conditions the reaction may be carried out in a medium which contains less than 0.1 part by volume of water per one part by volume of organic solvent. In this case coupling efficiencies as high as 95% can be achieved while the selectivity with respect to the α-isomer may amount to over 80%.

The reaction temperature is not critical unless the production of a racemate as discussed hereafter is not desired. Temperatures between −5 and +60° C., preferably 10° C. and 35° C., are utilized, although higher or lower temperatures may also be employed. The reaction time is normally between 3 and 5 hours.

The quantity of salt of the amino acid alkylester used is at least equimolar to the amount of aspartic acid anhydride used. The unconverted amino acid alkylester can be removed from the reaction mixture at the end of the reaction in a simple manner, for example, by extraction with an aqueous acid, such as hydrochloric acid.

The carbobenzoxy group is removed, as is well known, by hydrogenation with hydrogen in the presence of a metal catalyst from the group consisting of nickel, palladium and platinum.

The use of an aqueous solution of the base in the reaction of the present invention results in some racemization of the aspartyl-amino acid esters produced. If this is not of importance, preference is given to the use of an aqueous base, however, if it is desired to prepare aspartyl-amino acid esters of high optical purity, preference is given to the use of an organic base soluble in the reaction medium. In addition if it is desired to prepare a product of high optical purity, the reaction should be carried out at a temperature of 0° C. or below with the organic base. At higher temperatures the degree of racemization increases rapidly, while at a temperature below —50° C., the reaction proceeds very sluggishly. For this reason, it is preferred to perform the reaction between —20 and 0° C. By using a non-aqueous base and operating at the lower temperature, racemization is virtually completely suppressed, and an aspartyl-amino acid ester of very high to essentially complete optical purity can be prepared.

In performing the process of the invention, salts of esters or diesters of a wide variety of different amino acids can be used. Salts of esters and diesters of monocarboxylic monoamino acids of the formula

R—CH(NH$_2$)COOH wherein R is lower alkyl of up to 5 carbon atoms, phenol substituted lower alkyl of up to 8 carbon atoms or

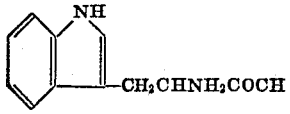

are useful in the present invention. Salts of esters and diesters of dicarboxylic monoamino acids of the formula HOOC—R—CH(NH$_2$)COOH wherein R is an alkylene group of 1–4 carbon atoms can also be used. In addition, polyamino acids of the formula

H$_2$N—R—CH(NH$_2$)COOH with a protected terminal amino group wherein R is as defined above for the dicarboxylic monoamino acids can be utilized in the form of the salt of the ester thereof. Finally, salts of esters of heterocyclic amino acids of the general formula

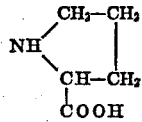

and

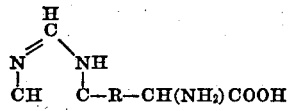

wherein R is as defined above for dicarboxylic monoamino acids can be used. Some examples of amino acids, of which the salts of the esters or diesters can be used, are, e.g., alanine, valine, leucine, proline, tryptophane, lysine, arginine, phenylalanine, tyrosine, methionine, methoxytyrosine, hexahydrophenylalanine, phenylglycine, hexahydrophenyl glycine, aspartic acid and glutamic acid. The α-aspartyl derivatives of the latter eight amino acids mentioned above are sweeteners. The preparation of sweeteners according to this invention is preferably started from a salt of a L-amino acid lower alkylester wherein the alkyl group has at most 4 carbon atoms, and from N-carbobenzoxy-L-aspartic acid anhydride. In general, however, other amino acids and other ester types can be used. In the preparation of sweetening agents, a salt of the methyl ester of L-phenylalanine of L-phenylglycine, or a salt of the dimethyl ester of L-aspartic-acid or L-glutamic acid is preferably utilized.

The salt of the amino acid ester used in the process may be derived from various acids, especially from various strong inorganic acids, e.g., from hydrochloric acid, sulphuric acid, phosphoric acid or hydrobromic acid. Preferably, use is made of the readily accessible hydrochloric acid salts.

The reaction medium is a polar solvent that does not react with the reactants. It need not necessarily be a solvent for the salt of the amino acid ester and/or the anhydride. Suitable solvents are i.e. chlorobenzene, methylene dichloride, trichloroethylene, tetrahydrofuran, ethylacetate, butylacetate and acetonitrile. Low-boiling chlorinated hydrocarbons of up to 5 carbon atoms can also be used as well as mixtures of the solvents.

Recovery of the reaction products from the reaction mixture is accomplished by methods well known in peptide chemistry. For example, the excess base remaining in the reaction mixture is neutralized and subsequently, the N-carbobenzoyl-aspartyl amino acid ester is extracted from the reaction mixture and purified by recrystallization. In the coupling reaction both the α-aspartyl compound and the β-aspartyl compound are formed. If desired, these two isomers can be separated, for example, by selectively extracting the β-isomer from the organic solvent by means of a sodium carbonate solution. In the preparation of sweeteners and sweetening agents, the isomers need not necessarily be separated, since the β-aspartyl-amino acid alkylester, although lacking a sweet flavor, seemingly does not detract from the sweetening effect of the α-isomer.

The α- and β-isomers of the N-carbobenzoxy-aspartyl-amino acid alkylester can also be separated from each other, by taking up the isomer mixture in water or an aqueous solution in a known manner (e.g. by extraction, or by addition of water and evaporation of the organic solvent), and subsequently, extracting the resulting aqueous phase with an organic water-immiscible solvent for aspartyl-amino acid esters, with the pH of the aqueous phase being kept at 6–7. The organic solvent extracts the α-isomer from the aqueous isomer mixture. The remaining aqueous mixture is then adjusted to a pH below 2.5 by addition of an inorganic acid. The aqueous mixture is then subjected to extraction with a solvent of the same type or similar to the solvent used in the first extraction, and this time β-isomer is absorbed by the organic solvent.

The carbobenzoxy group can be removed from the isomer molecules in the known manner by catalytic hydrogenation with hydrogen over a palladium catalyst or the like. The α-[L- or DL-] aspartyl-[L- or DL-] amino acid alkyl esters prepared according to the invention, which have a sweetening effect, can be added directly to foodstuffs, candies, medicines etc., or they can be further processed to resemble sweetening agents such as granulated sugar and liquid sweetening agents. This can be done by mixing the active substance with an inert, solid or liquid carrier which is fit for human consumption. The esters prepared according to the invention can be added to other sweetening agents such as sugar, and in many cases combinations of the dipeptide sweetening agent of the present invention and a known sweetening agent show an increased sweetening effect.

The invention will be further described by means of the following examples which refer to the preparation of sweeteners. However, the invention is not to be limited

EXAMPLE I (A) Preparation of N-carbobenzoxy-aspartic acid

Aspartic acid (260 g.) was dissolved in an aqueous solution containing 336 g. of sodium bicarbonate and 5000 g. of water. While maintaining the aqueous solution at a temperature of 2–3° C., 346 ml. of benzyloxycarbonylchloride were added to the solution. The pH of the solution was maintained at 8–9 by addition of 1200 ml. of 2 N sodium hydroxide solution. The reaction mixture was extracted with diethyl ether, acidulated to a pH of 2 by means of sulphuric acid, and again extracted with the same ether. From this ether layer 341 g. of N-carbobenzoxy-aspartic acid are recovered.

(B) Preparation of N-carbobenzoxy-aspartic acid anhydride

A flask containing a mixture of 40 g. of N-carbobenzoxy-aspartic acid and 88 ml. of acetic anhydride was shaken for three hours. Next, acetic acid and acetic anhydride were distilled from the mixture under 10 mm. Hg vacuum. Dry dioxane 65 g. was then added to the residue and removed by evaporation at 100° C. Dry xylene 50 g. was then added to the residue and removed by evaporation of 125° C. This yields 35.5 g. of N-carbobenzoxy-aspartic acid anhydride.

(C) Preparation of N-carbobenzoxy-aspartyl phenylalanine methylester

N-carbobenzoxy-aspartic acid anhydride (39 g. of 0.156 mole) and the hydrochloric acid salt of phenyl alanine methylester (41.9 g., 0.194 mole) were dissolved in 200 ml. of ethylacetate. To this organic solution a solution of 0.38 mole of sodium bicarbonate in 400 ml. of water was gradually added over a period of one hour while maintaining the mixture at a temperature of 25° C. The mixture was then allowed to further react for 20 hours at a temperature of 18° C. Subsequently, the mixture was extracted with 500 ml. of 1 N hydrochloric acid solution and the aqueous phase containing phenylalanine methylester was separated from the organic solution, and the organic solution was further extracted with an aqueous soda solution. The resulting aqueous phase was separated from the organic phase and subjected to an extraction with ethylacetate with the pH of the aqueous phase being kept at 6. The ethyl acetate phase was separated from the aqueous phase and the pH of the aqueous phase was adjusted to 1 by addition of an inorganic acid. The aqueous solution which had been adjusted to a pH of 1 was then subjected to further extraction with ethylacetate. The ethyl acetate solutions from the later two extractions was separately dried and evaporated. The first solution yielded 30.3 g. of N-carbobenzoxy-α-aspartyl phenylalanine methylester and the second solution yielded 19.8 g. of the β-isomer. The overall yield was 50.1 g., 60% of which was α-isomer. The efficiency of the reaction based on the α-isomer was 45%.

(D) Preparation of α-aspartyl phenylalanine methylester

A catalyst (10 grams) consisting of 10% Pd supported on a carbon carrier was added to a solution of 32 g. of N-carbobenzoxy-α-aspartyl phenylalanine methylester in 300 ml. of methanol. Hydrogen gas was bubbled through the reaction mixture until the evolution of carbondioxide had ceased. The catalyst was removed by filtering the mixture. The mixture contained 22 g. of α-aspartyl phenylalanine methylester.

EXAMPLE II

Preparation of N-carbobenzoxy-α-aspartyl phenylalanine methylester

N-carbobenzoxy-aspartic acid anhydride (96 g., 0.385 mole) and the hydrochloric acid salt of phenylalanine methylester (150 g., 0.700 mole) were dissolved in 700 ml. of ethylacetate. A solution of potassium carbonate (48.5 g., 0.35 mole) in 50 ml. of water was added gradually over a period of 2.3 h. to the ethylacetate solution while the temperature of the mixture was maintained at 18° C. The mixture was then allowed to further react for 20 hours at a temperature of 15° C. Then, 100 ml. of water was added and the reaction mixture was processed further a described in Example I–(C). In this way, 157 g. of product was obtained, of which 81% was α-isomer. The yield of α-isomer based on the amount of anhydride was 76%. The product was further processed according to the procedure described in Example I–(D). Substantially all of the α-isomer was converted to α-aspartyl phenylalanine methylester.

EXAMPLE III

Preparation of N-carbobenzoxy-α-L-aspartyl-L-phenylalanine methylester

N-carbobenzoxy-L-aspartic acid anhydride (99.6 g., 0.40 mole) and the hydrochloric acid salt of L-phenylalanine methylester (94.8 g., 0.44 mole) were dissolved in 700 ml. of ethylacetate. To this solution, which was maintained at a temperature of 18° C., a solution of potassium carbonate (30.4 g., 0.22 mole) dissolved in 37 ml. of water was gradually added over a period of 2 hours. The reaction mixture was maintained at a temperature of 10° C. for an additional 3 hours, and then 76 ml. of water was added thereto. The reaction mixture was then processed as described in Example I–(C) and 163.4 g. of product was obtained, of which 134.3 g. was α-isomer. The yield of α-isomer based on the amount of aspartic anhydride was 78%. Substantially all of the product was converted to α-L-aspartyl-L-phenylalanine methylester by hydrogenation in the presence of hydrogen and a palladium catalyst.

EXAMPLE IV

N-carbobenzoxy-aspartic acid anhydride (0.4 mole) and the hydrochloric acid salt of phenylalanine methylester (0.44 mole) were allowed to react with each other as described in Example III. After termination of the reaction, the non-converted phenylalanine methylester was removed and the solvent evaporated. Then 113 g. of the resulting solid was extracted in 6 successive steps using 1 liter of ether in each step. The ether phase was then evaporated to 1700 ml. and 48 g. of solid precipitated from the solution. The precipitate consisted of 20% α-isomer and 80% β-isomer. The remaining ether solution contained 64.3 g. of N-carbobenzoxy-aspartyl phenylalanine methylester, which was converted by hydrogenation in the presence of a Pd catalyst to α-aspartyl phenylalanine methylester.

The following examples, V–VIII inclusive, demonstrate modes of performing the process of the present invention where an organic base is used. It has been found that measurement of the optical rotation is not completely suitable for demonstrating low degrees of racemization. Both thin-layer chromatography and determination of the degree of racemization of the individual amino-acids after hydrolysis of the dipeptide by means of an amino-acid analyzer give more accurate and comparable results. In the experiments described below the optical purity was determined by thin-layer chromatography. The optical purity was determined equal to 100% if only one sharply defined spot could be visualized by careful thin-layer chromatography.

EXAMPLE V

Preparation of α-L-aspartyl-L-phenyl glycine methylester

To a suspension of 1 mole of N-carbobenzoxy-L-aspartic acid anhydride and 1 mole of the hydrochloric acid salt of L-phenyl glycine methyl-ester in 1500 ml. of methylene dichloride, there were gradually added 2 moles of triethylamine over a period of 4 hours. The reaction mixture was maintained at a temperature of 10° C. After a total reaction time of 5 hours, the reaction mixture was poured into 600 ml. of 2 N hydrochloric acid at a temperature of 0° C. The organic solution was separated from the aqueous phase and extracted with water in three portions of 250 ml. each. After that, the organic solution was extracted with eight portions of 0.5 N soda solution, using 100 ml. in each portion, to remove the β-aspartyl compound formed. Upon evaporation of the organic phase and recrystallization of the resulting crystal mass from a mixture of 250 ml. of water and 300 ml. of methanol, there remained 205 g. of pure N-carbobenzoxy - α - L - aspartyl-L-phenyl glycine methylester.

Hydrogenation of this crystal mass in 4 l. of methanol in the presence of hydrogen and 15 g. of 10% Pd catalyst ultimately yielded 135 g. of α-L-aspartyl-L-phenyl glycine methylester which, when examined chromatographically, proved to be pure and free of any racemate.

EXAMPLE VI

Preparation of α-L-aspartyl-L-glutamic dimethylester

Using the procedure described in Example V, 1 mole of N-carbobenzoxy-L-aspartic acid anhydride, 1 mole of the hydrochloric acid salt of L-glutamic dimethylester and 2 moles of triethylamine were reacted with each other. Processing and hydrogenation of the mixture yielded 116 g. of α-L-aspartyl-L-glutamic dimethylester which, examined chromatographically, proved to be pure and free of any racemate.

EXAMPLE VII

Preparation of α-L-aspartyl-L-phenyl alanine methylester

Using the procedure described in Example V, 1 mole of N - carbobenzoxy - L - aspartic acid anhydride, 1 mole of the hydrochloric acid salt of L-phenyl alanine methylester and 2 moles of tri-n-propylamine were reacted with each other in 1500 ml. of trichloro-ethylene. Processing and hydrogenation of the reaction mixture yielded 135 g. of α-L-aspartyl-L-phenyl alanine methyl-ester which, when examined chromatographically, proved to be pure and free of any racemate.

EXAMPLE VIII

Preparation of α-L-aspartyl-L-aspartic α'-β'-di-methylester

Using the procedure described in Example V, 1 mole of N - carbobenzoxy - L - aspartic acid anhydride, 1 mole of the hydrochloric acid salt of L-aspartic acid dimethylester and 2 moles of triethylamine were reacted with each other at a temperature of −2° C. Processing and hydrogenation yielded 112 g. of α - L - aspartyl-L-aspartic acid α'-β'-dimethylester which was chemically pure and showed less than 1% racemization.

What is claimed is:

1. In a process for the production of α-aspartyl-amino acid alkyl esters by reacting a reaction mixture of N-carbobenzoxy aspartic acid anhydride with an amino acid ester in an inert, polar solvent reaction medium, separating the N-carbobenzoxy α-aspartyl-amino acid ester from the remainder of the reaction mixture and converting the N-carbobenzoxy α-aspartyl-amino acid ester to α-aspartyl-amino acid esters by splitting the N-carbobenzoxy group from said N-carbobenzoxy α-aspartyl-amino acid esters, the improvement comprising forming a mixture of a salt of said amino acid ester and said anhydride in said reaction medium, then adding a base to the reaction mixture, said base being added in an amount at least the molar equivalent to the amount of amino acid ester salt in said mixture, and maintaining said mixture at a temperature no greater than 35° C., whereby the yield of α-aspartyl-amino acid esters is increased and the by-product formation of diketopiperazines is reduced.

2. In a process for the preparation of α-aspartyl-amino acid esters, said processing comprising
   (a) forming a mixture of N-carbobenzoxy α-aspartic acid anhydride and an amino acid ester in an inert polar solvent reaction medium,
   (b) reacting the anhydride and the amino acid ester together to form N-carbobenzoxy-α-aspartyl-amino acid esters,
   (c) separating the N-carbobenzoxy α-aspartyl-amino acid esters from the remainder of the reaction mixture, and
   (d) converting the N-carbobenzoxy α-aspartyl-amino acid esters by splitting the N-carbobenzoxy group therefrom by catalytic hydrogenation with a palladium group metal catalyst,
the improvement comprising forming a mixture of the salt of said amino acid ester and said anhydride in said medium, then adding a base to the mixture of said anhydride and said amino acid ester salt, said base being present in an amount at least the molar equivalent to the amount of said amino acid ester salt in said mixture
   said base selected from the group consisting of an aqueous solution of a carbonate or bicarbonate, and at least one organic base soluble in the reaction medium and having a pK$_b$ value above that of the amino acid ester,
and maintaining the resulting reaction mixture at a temperature no greater than about 35° C., whereby the yield of α-aspartyl-amino acid esters is increased and the by-product formation of diketopiperazines is reduced.

3. Process according to claim 1, wherein the base used is an aqueous solution of a carbonate or bicarbonate.

4. Process according to claim 3, wherein the ratio between the volumes of water and organic solvent during the reaction is lower than 0.5:1.

5. Process according to claim 4, wherein an aqueous potassium carbonate solution is added as said base.

6. Process according to claim 1 wherein the base is soluble in the reaction medium and has a pK$_b$ value above that of the amino acid ester.

7. Process according to claim 6, wherein said base is an organic base.

8. Process according to claim 7 wherein the base is a tertiary nitrogen base having the general formula

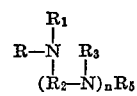

wherein $n$ is 0 or 1 and R, R$_1$, R$_3$ and R$_4$ are lower alkyl and R$_2$ is lower alkylene.

9. Process according to claim 7 wherein the reaction is carried out at a temperature between −20 and 0° C.

10. Process according to claim 1 wherein the amino acid ester salt is the hydrochloride acid salt of an amino acid ester.

11. Process according to claim 1 wherein the alcohol component of the salt of the amino-acid ester has from 1–4 carbon atoms.

12. Process according to claim 1 wherein the amino acid ester is L-amino-acid ester salt and the carbobenzoxy aspartic acid anhydride is N-carbobenzoxy-L-aspartic acid-anhydride.

13. Process according to claim 1 wherein α-L-aspartyl-L-phenylalanine methylester is prepared by starting from N-carbobenzoxy-L-aspartic acid anhydride and L-phenylalanine methylester HCl.

14. Process according to claim 1 wherein α-L-aspartyl-L-phenylglycine methylester is prepared from N-carbobenzoxyl-L-aspartic acid anhydride and L-phenylglycine methylester HCl.

15. Process according to claim 1 wherein α-L-aspartyl-L-aspartic acid dimethyl ester is prepared from N-carbobenzoxy-L-aspartic acid anhydride and L-aspartic acid dimethyl ester HCl.

16. Process according to claim 1 wherein α-L-aspartyl L-glutamic acid dimethyl ester is prepared from N-carbobobenzoxy-L-aspartic acid and anhydride and L-glutamic acid dimethyl ester HCl.

17. Process according to claim 1 wherein the α-N-carbobenzoxy-aspartyl-amino acid ester is separated from the said mixture by taking up the mixture of α- and β-isomers in water and extraction of the aqueous phase thus formed with an organic, water-immiscible solvent for said N-carbobenzoxy-aspartyl-amino acid ester, while the pH of the aqueous phase is kept at a value between about 6 and 7.

References Cited

UNITED STATES PATENTS

| | | | |
|---|---|---|---|
| 3,695,898 | 10/1972 | Hill et al. | 260—112.5 |
| 3,678,026 | 7/1972 | Ariyoshi et al. | 260—112.5 |
| 3,492,131 | 1/1970 | Schlatter et al. | 260—112.5 |
| 3,475,403 | 10/1969 | Mazur et al. | 260—112.5 |

OTHER REFERENCES

Le Quesne et al.: J. Chem. Soc., 1952, 24.
Kovacs et al.: J. Am. Chem. Soc., 85, 1839 (1963).

LEWIS GOTTS, Primary Examiner

R. J. SUYAT, Assistant Examiner

U.S. Cl. X.R.

99—140 A

UNITED STATES PATENT OFFICE
CERTIFICATE OF CORRECTION

Patent No. 3,808,190              Dated April 30, 1974

Inventor(s) Johannes J. Dahlmans, Bernardus H.N. Dassen and Wilhelmus H. J. Boesten It is certified that error appears in the above-identified patent and that said Letters Patent are hereby corrected as shown below:

Column 8, line 54, "$R_5$" should be --$R_4$--.

Column 9, line 9, the word "and" now appearing after the word "acid" should be deleted.

Signed and sealed this 11th day of February 1975.

(SEAL)
Attest:

RUTH C. MASON
Attesting Officer

C. MARSHALL DANN
Commissioner of Patents
and Trademarks